United States Patent
Samie et al.

(10) Patent No.: US 8,409,053 B2
(45) Date of Patent: Apr. 2, 2013

(54) TRANSMISSION WITH SELECTABLE ONE-WAY CLUTCH AND DUAL-PISTON CLUTCH

(75) Inventors: Farzad Samie, Franklin, MI (US); Chunhao J. Lee, Troy, MI (US); Chi-Kuan Kao, Troy, MI (US); Kumaraswamy V. Hebbale, Troy, MI (US); Robert K. Saley, Imlay City, MI (US)

(73) Assignee: Gm Global Technology Operations LLC, Detroit, MI (US)

( * ) Notice: Subject to any disclaimer, the term of this patent is extended or adjusted under 35 U.S.C. 154(b) by 243 days.

(21) Appl. No.: 12/977,477

(22) Filed: Dec. 23, 2010

(65) Prior Publication Data

US 2012/0165146 A1    Jun. 28, 2012

(51) Int. Cl.
| | |
|---|---|
| *B60W 10/02* | (2006.01) |
| *B60W 10/06* | (2006.01) |
| *F16H 61/48* | (2006.01) |
| *B60K 23/06* | (2006.01) |
| *F02N 11/08* | (2006.01) |
| *F16H 31/00* | (2006.01) |

(52) U.S. Cl. .......... 477/5; 475/5; 475/8; 475/140; 477/57; 477/167; 192/3.58

(58) Field of Classification Search .......... None
See application file for complete search history.

(56) References Cited

U.S. PATENT DOCUMENTS

| | | | | |
|---|---|---|---|---|
| 4,242,924 | A  * | 1/1981 | Melhorn et al. | 475/281 |
| 6,019,699 | A  * | 2/2000 | Hoshiya et al. | 477/20 |
| 7,766,790 | B2 * | 8/2010 | Stevenson et al. | 477/8 |
| 7,905,807 | B2 * | 3/2011 | Shimizu et al. | 475/5 |
| 7,942,781 | B2 * | 5/2011 | Kimes | 477/5 |
| 8,029,403 | B2 * | 10/2011 | Lee et al. | 475/276 |
| 8,210,979 | B2 * | 7/2012 | Jones et al. | 475/140 |
| 2003/0104900 | A1 * | 6/2003 | Takahashi et al. | 477/3 |
| 2008/0280726 | A1 * | 11/2008 | Holmes et al. | 477/5 |
| 2010/0122883 | A1 | 5/2010 | Bartos et al. | |

OTHER PUBLICATIONS

Co-pending U.S. Appl. No. 12/754,048, Dual-Piston Normally-Engaged Clutch, filed Apr. 5, 2010.

* cited by examiner

*Primary Examiner* — David D Le
*Assistant Examiner* — Mark Manley
(74) *Attorney, Agent, or Firm* — Quinn Law Group, PLLC

(57) ABSTRACT

A powertrain for a vehicle includes an engine, a transmission with an input member driven by the engine, and an output member. An electric motor is operable to drive the input member. The transmission has an electrically-actuated one-way clutch with a neutral mode in which the clutch freewheels in both directions of rotation, and a locked mode in which the clutch is locked in one direction of rotation. The transmission also has a hydraulically-actuated dual-piston clutch with a spring that biases the dual-piston clutch to an engaged state. The one-way clutch is in the neutral mode and the spring biases the dual-piston clutch to the engaged state prior to a key start of the engine. The one-way clutch is actuated to the locked state following ignition of the engine after a key start, and remains in the locked state during an autostop of the engine.

11 Claims, 4 Drawing Sheets

TRANSMISSION WITH SELECTABLE ONE-WAY CLUTCH AND DUAL-PISTON CLUTCH

TECHNICAL FIELD

The invention relates to a transmission for a vehicle, especially for a powertrain with an engine having an automatic start/stop capability, and a method of operating such a powertrain.

BACKGROUND

One type of vehicle, often referred to as a light hybrid or a belt-alternator-starter (BAS) hybrid, shuts the engine off at stoplights, referred to as an autostop, and then restarts the engine using an electric motor operatively connected to the input member. Such vehicles typically employ a hydraulic pump that is directly or indirectly driven by the engine to provide hydraulic pressure to the transmission clutches and brakes. With the engine off, hydraulic pressure from the engine-driven pump is not available. When the engine is restarted, it takes some amount of time for the engine-driven pump to provide sufficient hydraulic pressure to operate the clutches and brakes. Accordingly, when the engine is off, an additional electric pump or a hydraulic accumulator is necessary to provide the hydraulic pressure necessary to maintain the transmission in a first forward gear ratio, as is required when the engine is restarted.

SUMMARY

A powertrain for a vehicle includes an engine, a transmission with an input member driven by the engine, and an output member. An electric motor is operatively connected to the input member and is operable to drive the input member. The transmission has an electrically-actuated one-way clutch with a neutral mode in which the clutch freewheels in both directions of rotation, and a locked mode in which the clutch is locked in one direction of rotation. The transmission also has a hydraulically-actuated dual-piston clutch with a spring that mechanically-biases the dual-piston clutch to an engaged state without application of power. The one-way clutch is in the neutral mode and the spring biases the dual-piston clutch to the engaged state prior to a key start of the engine so that torque is not transferred to the output member during ignition. The one-way clutch is actuated to the locked mode following ignition of the engine after a key start, and remains in the locked state during an autostop of the engine. Accordingly, the locked one-way clutch and the spring establish a first forward gear state, and maintain the transmission in a first forward gear state during an autostop without hydraulic or electric power.

A method of controlling a powertrain with an engine and a transmission includes providing a dual-piston clutch with a spring normally engaging the clutch without application of hydraulic or electric power. The dual-piston clutch has a first piston that is hydraulically-actuatable to engage the clutch, and a second piston that is hydraulically-actuatable to disengage the clutch by overcoming the spring. The method further includes providing a one-way clutch having a neutral mode in which the one-way clutch freewheels in both directions and having a locked mode in which the one-way clutch locks in one-direction of rotation. The second piston is actuated to overcome the spring after a key start of the engine with the one-way clutch in the neutral mode so that neither the one-way clutch nor the dual-piston clutch carries torque. Furthermore, another clutch connected in parallel with the one-way clutch is hydraulically actuated while in the parked or neutral state and after the second piston is actuated. The one-way clutch is then switched to the locked mode to thereby prepare the transmission for a shift to a first forward gear.

The above features and advantages and other features and advantages of the present invention are readily apparent from the following detailed description of the best modes for carrying out the invention when taken in connection with the accompanying drawings.

DETAILED DESCRIPTION

Figure 1:
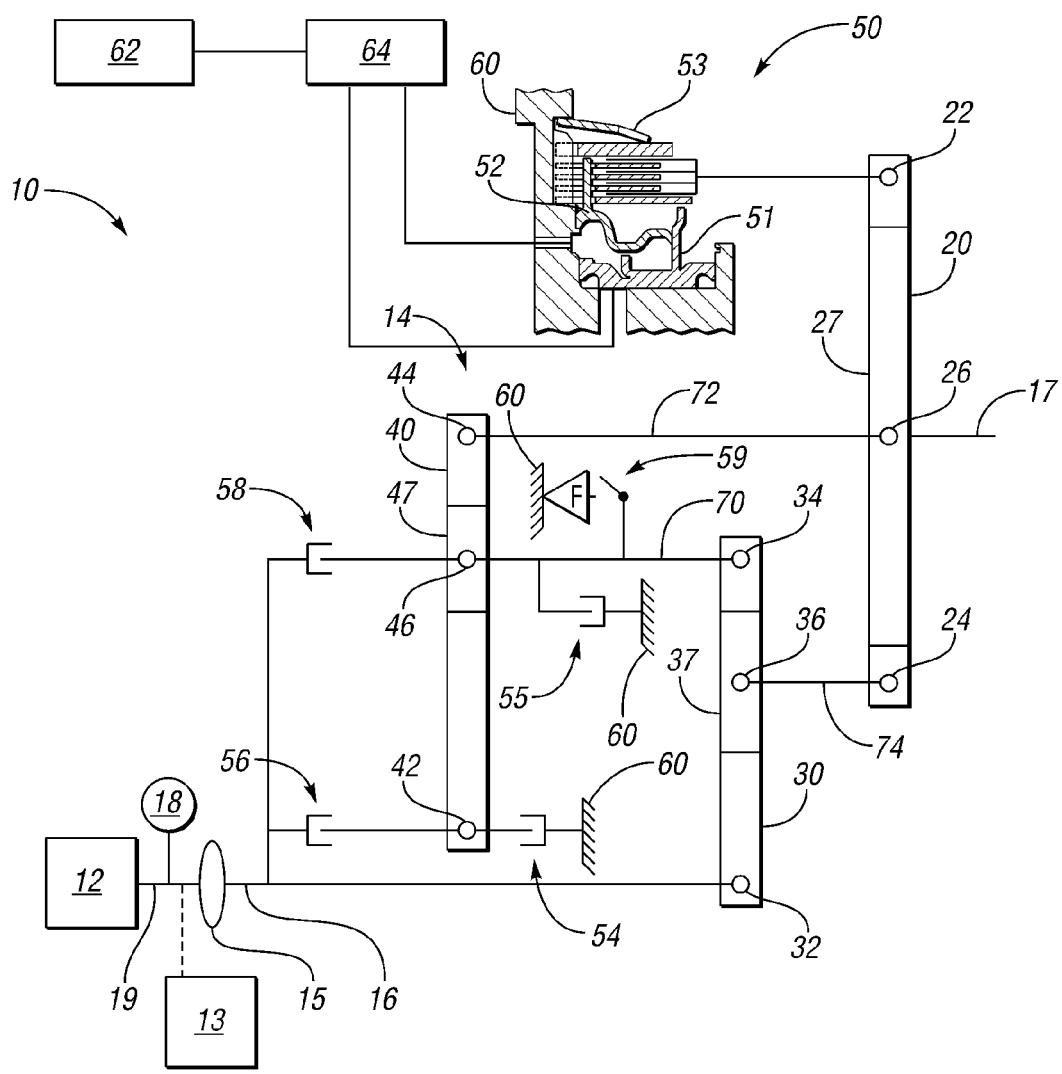
FIG. 1 is a schematic illustration of a powertrain having a transmission.

Referring to the drawings, wherein like reference numbers refer to like components throughout the several views, FIG. 1 shows a powertrain 10 that includes an engine 12 and an electric motor 13 operatively connected to a transmission 14 at a transmission input member 16 operatively connected through a torque converter 15 with a crankshaft 19 of the engine 12. The transmission 14 also has an output member 17. An engine-driven pump 18 is connected for rotation with the crankshaft 19, and generates hydraulic pressure when the engine 12 is on, with the pressure being proportional to the speed of rotation of the crankshaft 19.

The transmission 14 includes three planetary gear sets 20, 30 and 40. The gear sets 20, 30 and 40 are shown schematically in lever form as understood by those skilled in the art. Planetary gear set 20 includes a sun gear member 22, a ring gear member 24, and a carrier member 26 that rotatably supports pinion gears 27 that mesh with the sun gear member 22 and the ring gear member 24. Planetary gear set 30 includes a sun gear member 32, a ring gear member 34, and a carrier member 36 that rotatably supports pinion gears 37 that mesh with the sun gear member 32 and the ring gear member 34. Planetary gear set 40 includes a sun gear member 42, a ring gear member 44, and a carrier member 46 that rotatably supports pinion gears 47 that mesh with the sun gear member 42 and the ring gear member 44. The sun gear members 22, 32, 42 are first members of the respective planetary gear sets 20, 30 and 40. The carrier members 26, 36, 46 are second members of the respective planetary gear sets 20, 30 and 40. The ring gear members 24, 34, 44 are third members of the respective planetary gear sets 20, 30 and 40. A first interconnecting member 70 connects the carrier member 46 for common rotation with the ring gear member 34. A second interconnecting member 72 connects the ring gear member 44 for common rotation with the carrier member 26. A third interconnecting member 74 connects the carrier member 36 for common rotation with the ring gear member 24.

The transmission further includes multiple hydraulically-actuated torque-transmitting mechanisms, including a dual-piston braking clutch 50, brake-type clutches 54 and 55, and rotating-type clutches 56 and 58. Clutch 55 is also referred to herein as a second clutch. The dual-piston braking clutch 50 has a first piston 51, a second piston 52, and a spring 53 that biases the clutch 50 to an engaged position without hydraulic pressure or electronic actuation. The dual-piston braking clutch 50 is described in further detail below. The transmission 14 also includes an electrically-actuated selectable one-way braking clutch 59 that has both a neutral mode and a locking mode. Once actuated to the neutral mode or the locking mode, the clutch 59 will remain in that mode without hydraulic pressure and without electrical power until subsequently actuated to shift to the other mode. In the neutral mode, the clutch 59 freewheels in both directions of rotation. In the locking mode, the clutch 59 locks in one direction of rotation to ground the interconnecting member 70 to a stationary (non-rotating) member, such as the transmission housing 60, and can freewheel in the other direction of rotation. Because the spring 53 mechanically biases the braking clutch 50, and the clutch 59 is maintained in its established mode without hydraulic pressure, the transmission 14 is in a first forward gear state (i.e., the lowest forward driving gear). During an autostop, the clutch 59 is in the locked mode.

A controller 62 receives input signals indicative of vehicle operating conditions and operator input. The controller 62 has a processor with a stored algorithm that determines which clutches should be engaged, and what mode the one-way clutch 59 should be set to. The controller 62 sends control signals to solenoids or pressure control actuators in a valve body 64 to direct hydraulic pressure generated by the pump 18 to selected ones of the clutches 50, 54, 55, 56 and 58. The controller 64 can send an electrical signal to the actuator 183 shown in FIGS. 3 and 4 to actuate the one-way clutch.

The clutch engagement schedule for the transmission 14 is as follows. In a park/neutral state when the engine 12 is off before a key start, the motor 13 is also off. The spring 53 engages the clutch 50, braking the sun gear member 22. The clutch 59 is in the neutral mode, so that it can freewheel in both directions of rotation.

During a key start, the transmission 14 is in a park or neutral state. Initially, prior to ignition, there is no hydraulic pressure. As the motor 13 starts the engine 12, even though the spring 53 is causing the clutch 50 to be engaged, the clutch 59 freewheels, so that ring gear member 34 and carrier member 46 cannot carry torque, the planetary gear sets 30 and 40 cannot carry torque, and the output member 17 cannot carry torque, and no motion is caused at the output member 17. After ignition, while still in a park or neutral state, even the relatively low speed of the engine 12 allows the pump 18 to provide sufficient pressure to overcome the spring 53, so that the clutch 50 is not engaged and the sun gear member 22 is released, causing gear set 20 to be inactive. Gear set 40 is also inactive, as sun gear 42 can spin freely. With neither clutch 50 nor clutch 56 engaged, no torque can be transferred to the output member 17. After clutch 50 is disengaged, the controller 62 causes the valve body 64 to direct the hydraulic pressure to engage clutch 55 to ground the interconnecting member 70 and the carrier member 46 and ring member 34 connected with the interconnecting member 70. With clutch 55 engaged, the clutch 59 is electrically-actuated to change modes to the locked mode.

With the engine 12 started, the transmission 14 can be placed in first gear by the controller 62 by directing hydraulic pressure to the first piston 51 to engage clutch 50. The clutch 59 is still in the locked mode. The planetary gear sets 20 and 30 are active, and torque is transferred to the output member 17. At low vehicle speeds or at a complete stop in first gear, the controller 62 directs hydraulic pressure from the valve body 64 to clutch 55 to engage clutch 55. Clutch 55 is engaged only at the beginning of the shift to the first gear, and does not carry torque in the first gear. Clutch 55 is also engaged in reverse gear.

The controller 62 can place the powertrain 10 in an autostop mode in first gear by stopping the engine 12, such as when a vehicle with powertrain 10 waits at a stoplight. With the engine stopped, the pump 18 does not provide hydraulic pressure. The powertrain 10 has no electric pump and no accumulator to provide hydraulic or other pressure to the transmission 14. However, the clutch 59 is already in the locked mode, and remains in this mode without hydraulic pressure. The spring 53 causes the clutch 50 to be engaged, without requiring hydraulic pressure. When the engine 12 needs to be restarted from the autostop, such as when stopped at a traffic light and the light turns green, operator input such as removal of brake pressure or depression of an accelerator will signal the controller 62 (or a separate engine controller) to start the engine 12. Because the clutch 59 is already positioned in the locked mode and the spring 53 causes the clutch 50 to be engaged, the transmission 14 remains in the first gear state for launching the vehicle once the engine 12 is started from an autostop. Hydraulic pressure is not required to maintain the transmission in the first gear state (i.e., the first forward gear) during the autostop. Thus, an auxiliary electric motor or an accumulator is not required. As hydraulic pressure increases, the controller 62 causes the valve body 64 to direct pressure so that the clutch 55 is applied and the first piston 51 is actuated, so that the clutch 50 remains engaged.

The transmission 14 can be operated in any of the remaining gears as warranted by vehicle operating conditions. The clutch 59 remains in the locked state in all of the remaining forward gears and in the reverse gear, but carries no torque. To establish the reverse gear, clutches 56 and 55 are engaged. To establish the second forward gear, the clutches 54 and 50 are engaged. To establish the third forward gear, clutches 56 and 50 are engaged. To establish the fourth forward gear, clutches 58 and 50 are engaged. To establish the fifth forward gear, clutches 56 and 58 are engaged. To establish the sixth forward gear, clutches 54 and 58 are engaged. Thus, all shifts between subsequent gear states are single transition shifts because one clutch remains engaged while another clutch is shifted.

Figure 2:
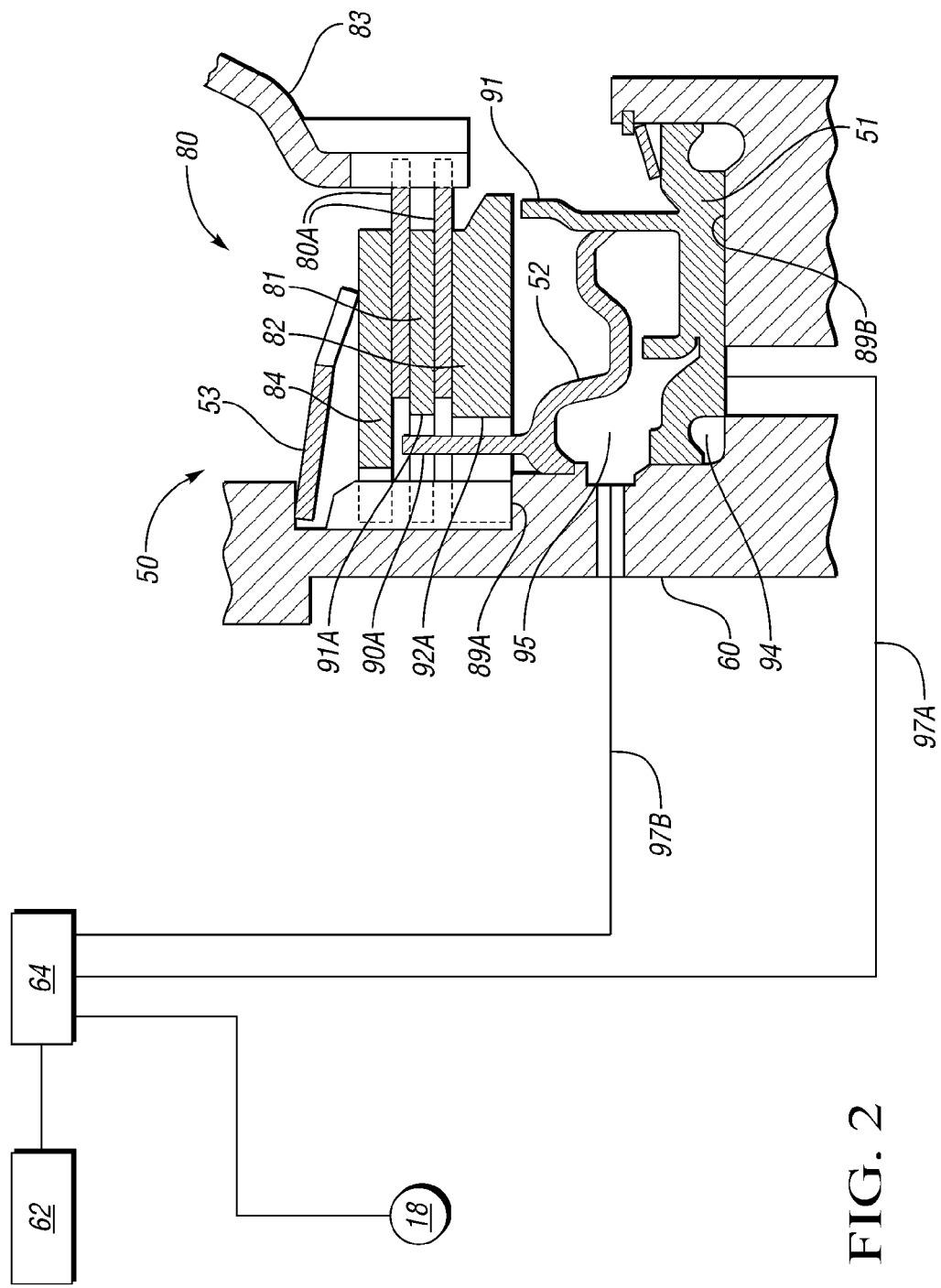
FIG. 2 is a schematic illustration of a dual-piston clutch included in the powertrain of FIG. 1.

Referring to FIG. 2, the dual-piston clutch 50 is shown in greater detail. Clutch 50 includes a friction-element, shown as a clutch pack 80. Clutch pack 80 includes interspaced sets of friction plates 80A and reaction plate(s) 81 placed in contact with one another when the clutch 50 is engaged, as known by those skilled in the art. Friction plates 80A are splined to and slightly movable along a hub 83 connected to the sun gear member 22 of FIG. 1. Clutch 50 also includes an apply plate 82, which is configured to press against the clutch pack 80 toward the plates 80A, 81 when hydraulic pressure is applied to the first piston 51. Additionally, clutch 50 includes a second plate 84, which functions as a backing member, and can be used to press against the clutch pack 80, or can be moved away from the clutch pack 80 to release the clutch pack 80, as described below. Clutch 50 also includes spring 53, shown as a Belleville spring, which is a biasing device configured to apply force to the second, or backing plate 84, to thereby clamp clutch pack 80 between first plate 82 and the second plate 84 to engage the clutch 50. In the as-assembled, pre-compressed state, Belleville spring 53 applies force to the second plate 84 to clamp clutch pack 80 between the first plate 82 and second plate 84, and, therefore, keeps the clutch 50 normally-engaged without application of hydraulic, pneumatic or electrical power. Housing 60 includes a specially formed or machined shoulder 89A for first plate 82 to contact and seat against. The shoulder 89A provides a reaction surface for the first plate 82, when the first plate 82 shifts in response to the force applied by the spring 53.

Clutch 50 also employs the first piston 51, referred to as apply piston 51, which is actuatable by hydraulic pressure to apply a force to the first plate 82 to engage the clutch 50. Clutch 50 has a second piston 52, referred to as release piston 52, which is hydraulically-actuatable to apply a force to the second plate 84 to move the second plate 84 away from the clutch pack 80, overcoming the spring 53 to release the clutch 50. The apply piston 51 is retained on its inner and outer diameters by the housing 60. When apply piston 51 is fully retracted, the apply piston 51 seats against a reaction surface 89B of transmission housing 60. There is sufficient clearance between apply piston 51 in its fully retracted state and first plate 82 to permit the clutch pack 80 to be clamped when only the force of spring 53 is applied, and neither piston 51, 52 is actuated. Under these conditions, the first plate 82 contacts and seats against shoulder 89A.

The release piston 52 is retained at its outer diameter by transmission housing 60, and at its inner diameter by a ring 91 formed on the surface of the apply piston 51. Release piston 52 includes a set of circumferentially-spaced fingers 90A (as shown) that protrude through opening 92A in the first plate 82, and through opening 91A in the reaction plate 81, thereby permitting the release piston 52 to make contact with and transmit force to the second plate 84 to move the second plate 84 toward the spring 53, overcoming the spring 53 and releasing the clutch pack 80. There is sufficient clearance between fingers 90A and second plate 84 to permit the clutch pack 80 to be clamped when only the force of the spring 53 is applied and the first plate 82 contacts and seats against the shoulder 89A. The force of the spring 53 is applied in a direction that is opposite to that of the apply direction of the pistons 51, 52. Clutch 50 is engaged when the first plate 82 is pressed against the clutch pack 80 by the force of the apply piston 51. Clutch 50 is also engaged when force is applied to the second plate 84 by the spring 53 in the absence of force of the release piston 52.

Controller 62 has a processor with a stored algorithm that controls operation of the valve body 64 to direct hydraulic pressure to selected ones of the clutches 50, 54, 55, 56, 58 and to the selector lever of clutch 59 (described below) to establish the gear and torque-transmitting capability of the transmission 14. Valve body 64 is configured to regulate the flow of hydraulic fluid received from engine-driven fluid pump 18, and pressurize fill cavities of the selected clutches, such as fill cavity 94 of the apply piston 51 or fill cavity 95 of the release piston 52. The valve body 64 is configured to permit one of the apply piston 51 and release piston 52 to be pressurized via fluid supply passages 97A and 97B, respectively, while relieving pressure inside the other of the two fill cavities via one of two separate vent passages (not shown). The valve body 64 may also cause pressure to be relieved from both fill cavities 94, 95 so that only the spring 53 acts on the clutch pack 80.

The mechanically-biased, normally-engaged clutch 50 facilitates engine stop/start function without the use of any auxiliary electric pump or accumulator. When the controller 62 (or a separate engine controller) starts the engine 12 from an autostop, such as when the vehicle brakes are released, the transmission 16 will already be in first gear due to the one-way clutch 59 and the clutch 50, as described above. When, the engine 12 has started, the controller 62 will direct the valve body 64 to send pressurized hydraulic fluid from pump 18 to the apply piston 51. While the hydraulic pressure is building up in the fill cavity 94, clutch 50 remains engaged via force provided by the spring 53. Once sufficient fluid pressure is built up in fill cavity 94, the fluid pressure will shift apply piston 51 toward first plate 82, which will in turn compress clutch pack 80 against second plate 84, compressing and flattening the Belleville spring 53.

When disengagement of clutch 50 is required for a particular operating mode in transmission 16, controller 62 will direct valve body 64 to send pressurized hydraulic fluid to the fill cavity 95 of the release piston 52, while simultaneously relieving the hydraulic pressure from fill cavity 94 of the apply piston 51. The hydraulic pressure will be directed to shift the apply piston 51 in the direction away from Belleville spring 53, as well as shift the release piston 52 toward the Belleville spring 53 in order to contact the second plate 84 and compress and flatten the Belleville spring 53. Consequently, clutch pack 80 will no longer be squeezed between the first and second plates 82, 84.

Figure 3:
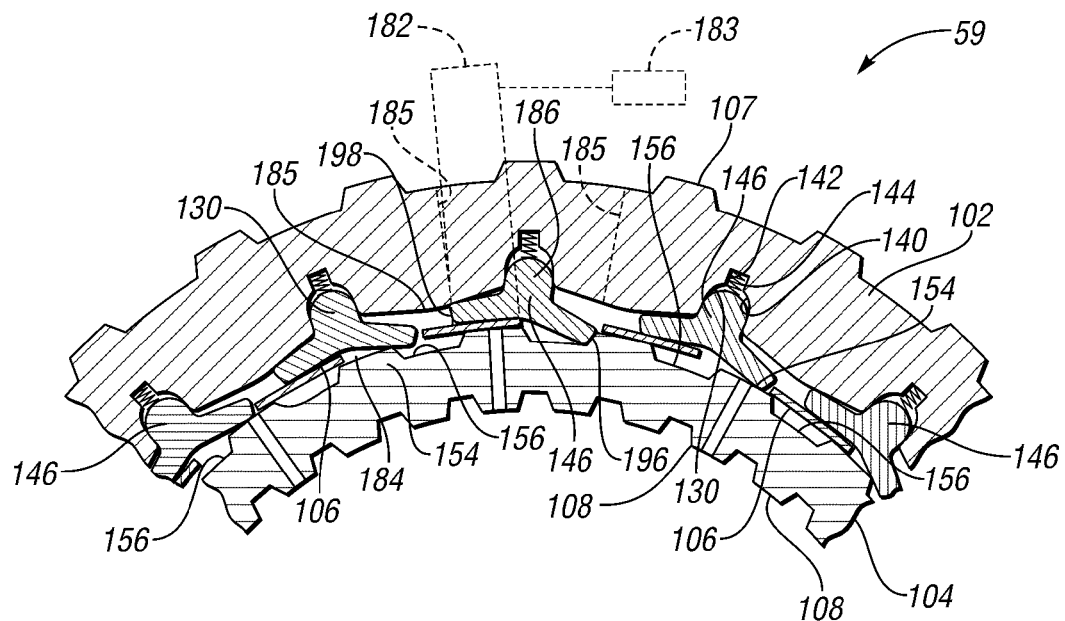
FIG. 3 is a schematic illustration of a selectable one-way braking clutch included in the transmission of FIG. 1 in a first locked mode with a locked state in one direction of rotation and a freewheeling state in an opposing direction of rotation.

Referring to FIG. 3, the one-way clutch 59 extends about a first axis 100, as shown in FIG. 3. The one-way clutch 59 includes a first race, also referred to as a pocket ring 102, a second race, also referred to as a notch ring 104, and a selector ring 106. Each of the rings 102, 104, 106 extends about the first axis 100. For clarity, the first and second races 102, 104 are referred to hereinafter as the pocket ring 102 and the notch ring 104, respectively. The pocket ring 102 includes a plurality of externally-projecting spline teeth 107 that mate with spline teeth (not shown) of the transmission housing 60 shown in FIG. 1. The notch ring 104 may include a plurality of equally spaced, internally-projecting teeth or splines 108 that are drivingly engageable or mateable with opposing teeth or splines of the interconnecting member 70 or the ring gear member 34 of FIG. 1. The one-way clutch 59 may include two end retaining rings (not shown) for retaining the rings 102, 104, 106 within the one-way clutch 59 as is known. A radially-inward facing internal face of the pocket ring 102 defines a plurality of equally spaced wells or rocker pockets 130 that are circumferentially-spaced about the first opening.

Each of the rocker pockets 130 includes a base recess 140 and a spring recess 142. A biasing device 144 may be disposed in each spring recess 142. The biasing device 144 may be a spring. In the embodiment shown, the biasing device 144 is an accordion style compression spring 144. Each spring 144 is configured to exert a sufficient spring force on an opposing rocker 146 that is at least partially disposed in the base recess 140 to thereby actuate or move the rocker 146 into engagement with the notch ring 104, as described in more detail below.

A selector lever 182 extends radially outward from the selector ring 106 adjacent an end face of the pocket ring 102 and is shown in phantom in FIG. 3. The selector lever 182 is configured to selectively rotate about the first axis 100 between a position that establishes the freewheeling mode and a position that establishes the neutral mode, as described below. The lever 182 may also establish a third position that locks the clutch 59 in an opposite direction of rotation than in the locked mode; however, that function is not required for use of the clutch 59 as described herein. The pocket ring 102 has an axially-extending ring portion that defines a plurality of equally spaced windows 184. The number of the windows 184 may be equal to the number of rocker pockets 130 defined in the pocket ring 102. Each window 184 is configured to selectively allow the rocker 146 to contact the notch teeth 154 when the selector ring 106 is positioned in the locked mode of FIG. 3.

Referring to FIG. 3, each rocker pocket 130 in the pocket ring 102 contains one of the rockers 146. Each rocker 146 is pivotable within the respective rocker pocket 130. Two diametrically-opposed rockers 146 may simultaneously engage diametrically opposed notches 156 in the notch ring 104 to cancel reaction forces generated by the engagement of rocker 146 with the respective notch 156. The rocker 146 rotates or may rock within the rocker pocket 130, depending on the position of the selector ring 106, due to the force provided by the biasing device 144 urging the rockers 146 outward from the base recesses 140 of the rocker pockets 130. Depending on the number of notches 156 in the notch ring 104 and the number of rockers 146, either the forward end 196 or the reverse end 198 of one or more of the rockers 146 will be positioned in respective notches 156 to engage respective teeth 154 of the notch ring 104. Engagement of one of the ends 196, 198 of the rockers 146 with the respective notches 156 in the notch ring 104 determines a locked mode of the clutch 59.

A solenoid, electric motor, or other electrically-actuated actuator 183, shown in phantom in FIG. 3, is operatively connected to the selector lever 182 and is controllable by the controller 62 of FIG. 1 to rotate the selector ring 106 a predetermined amount relative to the pocket ring 102 about the first axis 100, thereby changing the position of the windows 184 relative to the rockers 146.

Referring to FIG. 3, the direction of rotation of the notch ring 104 relative to the pocket ring 102 and the rockers 146 is illustrated with the selector ring 106 rotated to a locked position that established the locked mode of the clutch 59. When the selector ring 106 is in the locked position, the notch ring 104 is prevented from rotating in a counterclockwise direction when torque is acting on the notch ring 104 in the counterclockwise direction. The cylinder 186 of each rocker 146 is biased toward the rocker pocket 130 and toward the notches 156 by the biasing device 144. To achieve the locked mode, the selector ring 106 is actuated to move about the first axis 100 in the counterclockwise direction. The selector ring 106 may be rotated about the first axis 100 until the selector lever 182 contacts a rear-most end of a radial slot 185 in the pocket ring 102 through which the selector lever 182 extends, to prevent the selector ring 106 from further rotation in the counterclockwise direction. After the selector lever 182 contacts the end of the radial slot 185 as shown in FIG. 3, at least one radial window 184 is at least partially aligned with the forward end 196 of one of the rockers 146, biasing the rocker 146 into engagement with the teeth 154 of the notch ring 104 by the respective biasing device 144. As a result of the engagement of the forward end 196 and the notch ring 104, the notch ring 104 is prevented from rotating relative to the pocket ring 102 in a counterclockwise direction. Torque applied to the notch ring 104 in the counterclockwise direction will be reacted by the pocket ring 102 and the housing 60 which grounds the pocket ring 102.

Figure 4:
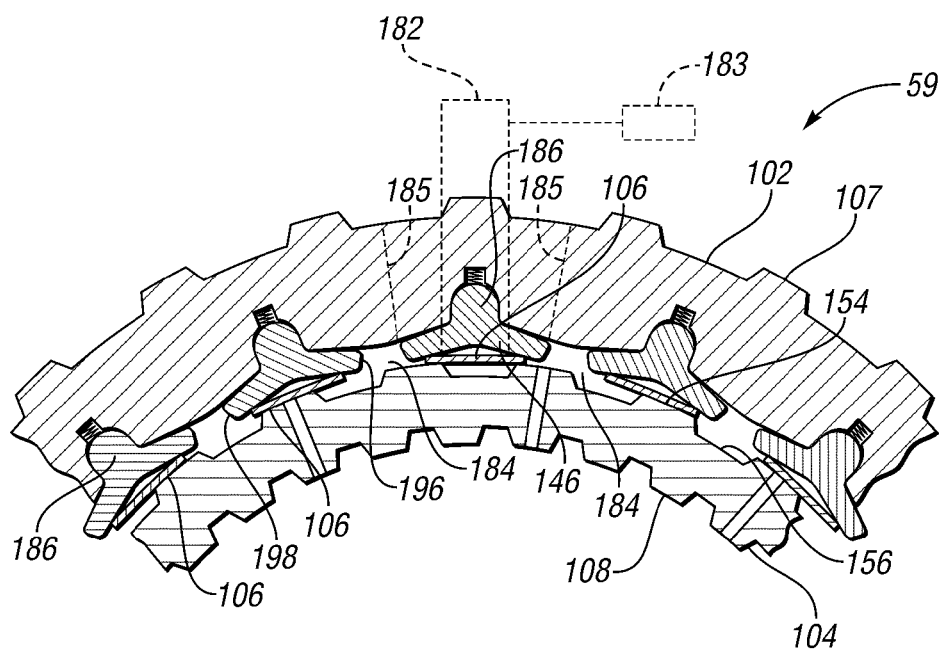
FIG. 4 is a schematic illustration of the selectable one-way braking clutch of FIG. 3 in a second mode in a neutral, freewheeling state in both directions of rotation.

Referring to FIG. 4, the selector ring 106 is shown actuated to a "neutral" mode by the actuator 183 moving the lever 182 to the position shown. The neutral mode is a freewheeling mode of the clutch 59 in which the notch ring 104 will freewheel in the direction of rotation in which torque is applied, whether in the clockwise or the counterclockwise direction. In the neutral position, both ends 196, 198 of the rockers 146 are prevented from entering any of the notches 156 so as not to engage the notch ring 104. The neutral position is achieved by moving the selector lever 182 to a center of the radial slot 185 in the pocket ring 102. As a result, the selector ring 106 moves such that each portion of the ring 106 between adjacent windows 184 is centered below the cylinder 186 of a corresponding rocker 146. The rockers 146 are forced by the selector ring 106 to rotate to the positions shown in FIG. 4, in which both ends 196, 198 of each rocker 146 are generally equidistant in a radial direction from notch teeth 154. When the ends 196, 198 are positioned this way, the notch ring 104 may rotate in either direction relative to the selector ring 106 and the pocket ring 102 without the transmission of torque because each end 196, 198 is prevented from entering any of the notches 156.

Figure 5:
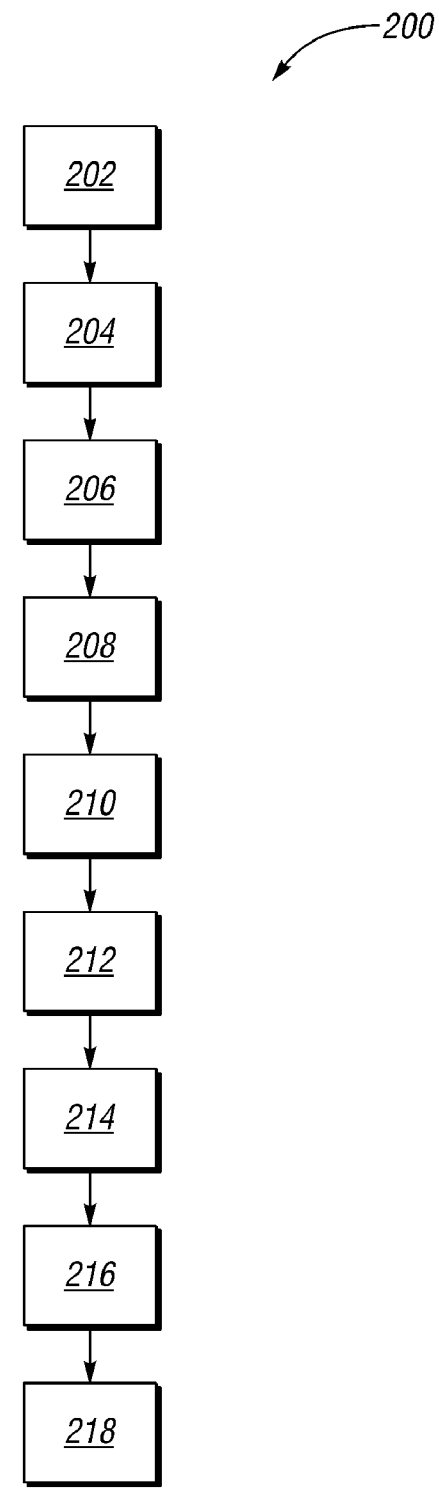
FIG. 5 is a flowchart of a method of operating a powertrain.

Referring to FIG. 5, and with reference to the powertrain 10, the dual-piston clutch 50, and the one-way clutch 59 of FIGS. 1-4, a method 200 of controlling a powertrain 10 with an engine 12 and a transmission 14 is shown in a flow diagram. The method 200 includes block 202, providing a dual-piston clutch 50 with a spring 53 normally engaging the clutch 50 without application of hydraulic or electric power. The clutch 50 has a first piston 51 hydraulically-actuatable to engage the clutch 50, and a second piston 52 hydraulically-actuatable to disengage the clutch 50 by overcoming the spring 53.

The method 200 further includes block 204, providing a one-way clutch 59 configured to have a neutral mode in which the clutch 59 freewheels in both directions and with a locked mode in which the clutch 59 locks in one-direction of rotation. Next, the method 200 includes block 206, actuating the second piston 52 to overcome the spring 53 after a key start of the engine 12 with the one-way clutch 59 in the neutral mode so that neither the one-way clutch 59 nor the dual-piston clutch 50 carries torque. Clutch 55, connected in parallel with the one-way clutch 59, can then be hydraulically-actuated in block 208 while the transmission 14 is in the parked or neutral state. The method 200 then includes block 210, switching the one-way clutch 59 to the locked mode, with the transmission 14 in a parked or neutral state, to thereby prepare the transmission 14 for a shift to a first forward gear in block 212. Alternatively, the transmission 14 is prepared for a shift to the reverse gear, in which clutch 56 is also applied.

During driving, vehicle operating conditions may warrant block 214, stopping the engine 12, with the one-way clutch 59 in the locked mode and the dual-piston clutch 50 engaged by the spring 53. For example, this may occur when the vehicle is temporarily stopped at a traffic light. In block 216, the engine 12 is restarted, with the transmission 14 already in the first gear state due to the one-way clutch 59 and the spring 53, even though hydraulic pressure was not available during the stop. Clutch 50 is engaged by the hydraulically-actuated first piston 51 in block 218. Then, as engine speed increases in the first gear, hydraulic pressure is no longer directed to the clutch 55.

While the best modes for carrying out the invention have been described in detail, those familiar with the art to which this invention relates will recognize various alternative designs and embodiments for practicing the invention within the scope of the appended claims.

The invention claimed is:

1. A powertrain for a vehicle comprising:
an engine;
a transmission with an input member driven by the engine and an output member;
an electric motor operatively connected to the input member and operable to drive the input member;
an electrically-actuated one-way clutch having a neutral mode in which the clutch freewheels in both directions of rotation and a locked mode in which the clutch is locked in one direction of rotation;
a hydraulically-actuated dual-piston clutch having a spring that mechanically-biases the dual-piston clutch to an engaged state without application of power; wherein the one-way clutch is in the neutral mode and the spring biases the dual-piston clutch to the engaged state prior to a key start of the engine so that torque is not transferred to the output member during ignition;

wherein the one-way clutch is actuated to the locked mode following ignition of the engine after a key start, and remains in the locked state during an autostop of the engine, the locked one-way clutch and the spring establishing a first forward gear during an autostop without hydraulic or electric power.

2. The powertrain of claim 1, further comprising:
another hydraulically-actuated clutch connected in parallel with the one-way clutch and configured to be engaged following ignition of the engine and prior to actuation of the one-way clutch to the locked mode.

3. The powertrain of claim 1, wherein the spring is a Belleville spring that compresses friction plates of the dual-piston clutch without application of hydraulic or electric power.

4. The powertrain of claim 1, wherein the transmission has multiple torque-transmitting mechanisms engageable in different combinations to transmit torque from the input member to the output member; and wherein the transmission is characterized by the absence of an additional pump used to provide hydraulic pressure to engage the torque-transmitting mechanisms or the dual piston clutch.

5. The powertrain of claim 1, wherein the selectable one-way clutch maintains the locked mode without application of hydraulic or electrical power.

6. The powertrain of claim 1, wherein the transmission includes three planetary gear sets and four additional selectively engageable torque-transmitting mechanisms; and
wherein the transmission is controllable to establish six forward speed ratios between the input member and the output member.

7. The powertrain of claim 6, wherein shifts between subsequent ones of the six forward speed ratios are single transition shifts.

8. The powertrain of claim 6, wherein the three planetary gear sets include a first planetary gear set, a second planetary gear set, and a third planetary gear set, each including a sun gear member, a carrier member, and a ring gear member;

wherein the transmission includes:
a first interconnecting member continuously connecting the carrier member of the third planetary gear set for common rotation with the ring gear member of the second planetary gear set;
a second interconnecting member continuously connecting the ring gear member of the third planetary gear set for common rotation with the ring gear member of the first planetary gear set; and
a third interconnecting member continuously connecting the carrier member of the second planetary gear set for common rotation with the ring gear member of the first planetary gear set.

9. The powertrain of claim 8, further comprising:
a stationary member;
wherein one of the four additional selectively engageable torque-transmitting mechanisms is selectively engageable to connect the input member for common rotation with the sun gear member of the third planetary gear set; and
wherein another of the four additional selectively engageable torque-transmitting mechanisms is selectively engageable to connect the sun gear member of the third planetary gear set to the stationary member.

10. The powertrain of claim 8, further comprising:
a stationary member;
wherein one of the four additional selectively engageable torque-transmitting mechanisms is selectively engageable to connect the input member for common rotation with the carrier member of the third planetary gear set; and
wherein another of the four additional selectively engageable torque-transmitting mechanisms is selectively engageable to connect the carrier member of the third planetary gear set to the stationary member.

11. The powertrain of claim 8, wherein the input member is continuously connected for common rotation with the sun gear member of the second planetary gear set.

* * * * *